(12) United States Patent
Chan

(10) Patent No.: US 7,255,959 B2
(45) Date of Patent: Aug. 14, 2007

(54) BATTERY CONTACT AND HOLDER

(76) Inventor: Sai Fai Chan, Flat F, 7/F, Evelyn Towers, 38 Cloud View Road, North Point (HK)

( * ) Notice: Subject to any disclaimer, the term of this patent is extended or adjusted under 35 U.S.C. 154(b) by 303 days.

(21) Appl. No.: 09/943,406

(22) Filed: Aug. 30, 2001

(65) Prior Publication Data

US 2003/0044676 A1  Mar. 6, 2003

(51) Int. Cl.
*H01M 2/10* (2006.01)
(52) U.S. Cl. ...................................... 429/100; 429/121
(58) Field of Classification Search ................... 429/96, 429/99, 100, 121
See application file for complete search history.

(56) References Cited

U.S. PATENT DOCUMENTS

| | | | |
|---|---|---|---|
| 3,899,231 A * | 8/1975 | Bray | 439/80 |
| 4,161,568 A | 7/1979 | Lund | |
| 4,221,454 A | 9/1980 | Wong | |
| 4,545,639 A | 10/1985 | Holden | 339/256 |
| 5,510,206 A | 4/1996 | Akami | 429/100 |
| 5,607,795 A * | 3/1997 | Saida | 429/100 |
| 5,827,619 A | 10/1998 | Iida | |

FOREIGN PATENT DOCUMENTS

| | | | |
|---|---|---|---|
| JP | 6-104041 | 4/1994 | |
| JP | 8-316651 | * 11/1996 | |
| JP | 9120807 | 5/1997 | 2/10 |
| JP | 2000-348699 | 12/2000 | |
| JP | 200184979 | 3/2001 | 2/10 |

OTHER PUBLICATIONS

Machine-assisted translation of JP 8-316651 A, Nov. 29, 1996.*
International Search Report PCT/CN02/00584 of Aug. 23, 2002, published with WO 03/19702, Mar. 6, 2003.

* cited by examiner

*Primary Examiner*—Jonathan Crepeau
(74) *Attorney, Agent, or Firm*—Ostrolenk, Faber, Gerb & Soffen, LLP

(57) ABSTRACT

A battery contact to engage with and to conduct electricity from a terminal of a battery where the battery contact is made from an elongate wire formed to define
 a) a torsional region of a substantially straight section of the wire and
 b) a battery terminal contact region extending substantially laterally from the torsional region at a first end of the torsional region, the battery terminal contact region including a battery terminal contact point, and
 c) a restraining leg of the wire extending substantially laterally from the torsional region at a second end of the torsional region,
where the battery terminal contact region is resiliently rotatable relative to the restraining leg about the torsional region, but wherein the displacement of the battery terminal contact region and restraining leg are biased back to an original angular condition as a result of torsional rigidity provided by the torsional region such that in use, the battery contact is supported by a holder in a manner to hold the restraining leg to allow a torsional force in the torsional region to bias the battery terminal contact point towards the battery terminal.

34 Claims, 4 Drawing Sheets

BATTERY CONTACT AND HOLDER

TECHNICAL FIELD

The present invention relates to a battery contact and holder.

BACKGROUND ART

The conventional battery contact in today's market may use one of several ways to provide pressure between the battery and a metallic contact plate to ensure good contact between them. One common form is by way of compression spring and another is by way of a metallic spring plate. Both ways have the disadvantage of high cost. A compression spring needs rivets or other mechanical means to affix it to a small metallic plate, which in turn is affixed to the battery holder. Production costs increase as a result of additional components and processing steps. For the metallic spring plate to provide good elasticity, material costs become high and the production cost is thus not substantially different from that of compression spring assembly.

Another problem with existing battery contacts is the ease of deformation. In the case of a compression spring, if it is incorrectly used (e.g. inserting the battery in the wrong direction) the spring can be deformed thereby losing its function. In the case of a metallic spring plate, since it can only be deformed to a relatively small extent it can easily be excessively deformed resulting in poor contact.

Therefore, it is desirable to provide a low cost contact plate with reliable performance and with simple structure. It is desirable to substitute conventional compression spring contacts and metal spring plate, whilst in operation being no different from that of conventional battery contacts or where it is in fact safer and more reliable. For example by providing a contact where the user will not be able to touch the easily deformed portion of the battery contact and will not touch any sharp point or edge.

Accordingly it is an object to provide a battery contact and holder which overcomes the abovementioned disadvantages or goes at least some way to providing the identified benefits or which will at least provide the public with a useful choice.

SUMMARY OF THE INVENTION

In a first aspect the present invention consists in a battery contact to be provided from a battery holder to allow it to engage with and to conduct electricity from a terminal of a battery placed in association with the battery holder, said battery contact comprising:

an elongate wire formed to define
a) a torsional region of said wire
b) a battery terminal contact region extending from the torsional region at a first end of said torsional region, said battery terminal contact region including a battery terminal contact point, to contact whether directly or indirectly when in use said terminal of a battery, and
c) a restraining leg of said wire extending from the torsional region at a second end of said torsional region, said battery terminal contact region extending from said torsional region in a manner to be torsionally rotatable relative to said restraining leg about an axis between said first and second ends of said torsional region, and wherein the displacement of said battery terminal contact region and restraining leg are biased back to an original angular condition as a result of torsional rigidity provided by said torsional region wherein, in use, said battery contact is supported by said holder in a manner to hold said restraining leg in a condition such that when a force is applied to said battery terminal contact region by said battery, the torsional force in said torsional region biases the battery terminal contact point towards said battery terminal.

Preferably said restraining leg is in use rigidly held by said battery holder and said battery terminal contact region is resiliently rotatable about said axis from said torsional region.

Preferably said torsional region is substantially straight.

Preferably said restraining leg extends from said torsional region, at least in part in a straight form.

Preferably said restraining leg is straight.

Alternatively said restraining leg is non-linear.

Alternatively said restraining leg includes a bend or curve.

Preferably said restraining leg includes a battery terminal contact region.

Preferably said restraining leg includes a PCB terminal contact point.

Preferably said battery terminal contact region is non-linear and preferably at least one bend or curve.

Preferably said battery terminal contact region includes a substantially straight section extending from said torsion region and a curved section intermediate of said straight section and a distal end of said wire at said battery terminal contact region.

Preferably, when viewed in a direction parallel to the direction in which a battery is biased towards said battery contact, is substantially shaped.

Preferably said torsional region is straight.

Preferably said battery terminal contact region and said restraining leg of said wire extend transverse from the torsional region.

In a second aspect the present invention consists in a holder for a battery which provides opposite polarity terminals exposed therefrom said holder comprising a battery receiving member dimensioned to receive at least in part a battery therewith, said battery receiving member including at least one wall portion towards which a battery when in use is urged towards and wherein said one wall portion presents therefrom a battery contact, said battery contact comprising an elongate wire formed to define
a) a torsional region of said wire
b) a battery terminal contact region extending from the torsional region at a first end of said torsional region, said battery terminal contact region including a battery terminal contact point, to contact whether directly or indirectly when in use, said terminal of a battery, and
c) a restraining leg of said wire extending from the torsional region at the second end of said torsional region, said battery terminal contact region extending from said torsional region in a manner to be torsionally rotatable relative to said restraining leg about an axis between said first and second ends of said torsional region, and wherein the displacement of said battery terminal contact region and restraining leg are biased back to an original angular condition as a result of torsional rigidity provided by said torsional region wherein said battery contact is supported by said battery receiving member in a manner to hold said restraining leg in a condition such that when a force is applied to said battery terminal contact region by said battery, the torsional force of said torsional region biases the battery terminal contact point towards said battery terminal.

Preferably said restraining leg is rotationally restrained in at least the same rotational direction as the force applied to said torsional region as a result of said battery terminal contact region, by it being located at least in part against a region of said battery receiving member.

Preferably said retention leg and said battery contact region of said wire extend from said torsional region to each include a distal end of said shaped wire.

Preferably said restraining leg is in use rigidly held by said battery holder and said battery terminal contact region is resiliently rotatable about said axis from said torsional region.

Preferably said restraining leg extends from said torsional region, at least in part in a straight form.

Preferably said restraining leg is straight.

Alternatively said restraining leg is non-linear.

Alternatively said restraining leg includes a bend or curve.

Preferably said restraining leg includes a battery terminal contact region.

Preferably said restraining leg includes a PCB terminal contact point.

Preferably said battery terminal contact region is non-linear and preferably at least one bend or curve.

Preferably said battery terminal contact region includes a substantially straight section extending from said torsion region and a curved section intermediate of said straight section and the distal end of said wire at said battery terminal contact region.

Preferably, when viewed in a direction parallel to the direction in which a battery is biased towards said battery contact, is substantially shaped.

Preferably said restraining leg is a torsional region rotation restraining arm which restrains the rotation of the torsional region at said second end of said torsional region as a result of force application to said torsional region by said battery terminal contact region.

Preferably the transition of the wire between said torsional region and the restraining leg and battery terminal contact region is defined by a bend in the wire.

Preferably the wall portion defines a separation between a region of said holder where a said battery is to be located and the exterior of such a region, the wall portion having at least one opening through which at least those portions of said battery contact extends to be presented for contact with a terminal of said battery.

Preferably said torsional region is straight.

Preferably said battery terminal contact region and said restraining leg of said wire extend transverse from the torsional region.

This invention may also be said broadly to consist in the parts, elements and features referred to or indicated in the specification of the application, individually or collectively, and any or all combinations of any two or more of said parts, elements or features, and where specific integers are mentioned herein which have known equivalents in the art to which this invention relates, such known equivalents are deemed to be incorporated herein as if individually set forth.

BRIEF DESCRIPTION OF THE DRAWINGS

One preferred form of the present invention will now be described with reference to the accompanying drawings in which;

With reference to FIG. 1, a basic form of the battery contact of the present invention is shown. The battery contact 1 consists of a shaped wire of for example a thickness of 0.3 to 2.0 mm and made from a material such as Carbon steel/stainless steel/bronze/phosphor bronze. The wire (which may also be considered a rod or a similar form which is preferably of a cylindrical, square or any other substantially consistent cross section) has been shaped to define the battery contact of the present invention. Many different forms of shape of the wire to define a battery contact are within the scope of this invention however with reference to FIG. 1, the wire has been shaped to define a battery terminal contact region 2, a restraining leg or region 3 which in use, may itself be provided to contact a battery terminal and a torsional region 4. The battery terminal contact region 2 is that region of the shaped wire which is provided to for example a battery holder 5 as shown in FIG. 3 in a manner such that when a battery is placed within or in a relationship with the battery holder, a portion of the battery terminal contact region can be provided to contact a terminal of a battery. The holder may include a battery receiving compartment may be designed to receive a standard form AA or similar sized cylindrical batteries wherein the opposite plurality terminals of the battery are provided at opposite ends of the casing of the battery or wherein the opposite plurality terminals are provided at or along the same face of the casing of the battery as for example shown in FIG. 3. Dependent on the nature of the terminal of the battery exposed from its casing, the battery terminal contact region may be appropriately shaped so that it can achieve a contact with the appropriate terminal on the battery. By way of example, an AA sized battery or the like will have a negative terminal which is flush or perhaps sightly rebated from the exterior surface of the casing of the battery and wherein the positive terminal is an upstand with respect to the casing of the battery. Where the battery contact 1 as shown in FIG. 1 is to be provided to contact the negative terminal of an AA sized battery, the wire may be further shaped to provide a region thereof which protrudes at an appropriate position to be located substantially where the terminal of the battery will be placed when it is engaged with the holder. A loop or bend in the wire as for example shown in FIG. 1 may be provided. Such a loop or bend in the wire also provides the advantage that the region 7 of the battery terminal contact region 2 which is provided to make contact with the battery terminal, is of a rounded nature thereby allowing for a battery to be easily inserted and removed from the holder. Such a curved shape will also prevent injury to people. The terminal contact region may otherwise be provided to indirectly contact a battery terminal via for example an intermediate conductive member.

With reference to FIG. 3, the compartment may be shaped so that a separate biasing member 8 is provided to direct a force onto the battery within the holder towards the battery contact 1. The battery contact 1 itself also provides a biasing force when it is engaged in an appropriate manner with the battery holder or an insert to be provided into the battery holder. Whether it is an insert or the actual holder complete, the principle in which the biasing of the battery terminal contact region is achieved so that the region 7 of the battery terminal contact region is biased towards making contact with the battery in the compartment is by way of a torsion. The battery terminal contact region extends substantially transverse to the general elongate axis 9 along which at least a substantial part of the torsional region extends. This axis 9 is substantial coaxial with the substantial part of the torsional region and both the battery terminal contact region 2 and the restraining leg 3 extend transverse thereto. In the most preferred form the transverse nature is at substantially 90 and when in an unloaded state, both the battery terminal contact region and the restraining leg extend preferably substantially in the same direction. However as for example shown in FIG. 7A, such may not necessarily be the case. The transverse extension of the wire to define the restraining leg from the torsional region may extend from the torsional region at any acute or obtuse angle sufficient such that when the restraining leg is restrained by for example a portion of the battery holder so that when a torsional force is applied to the torsional region, the restraining leg can prevent such torsional rotation occurring at that end of the torsional region from which the restraining leg extends therefrom. Angles from 45 through to 135 or even a larger range may be sufficient for the appropriate effect to be provided.

The torsional region as a result of its rotation being substantially restrained by the restraining leg 3, provides a torsional bias to the rotation of the battery terminal contact region extends. The degree of torsional bias will of course be dependent on the nature of the material that is chosen and the length of the intermediate region of said wire. As a result of the rotation of the torsional region being substantially restrained by said restraining leg at least in a rotational direction away from where the region 7 is to make contact with the battery terminal, a torsionally bias can be provided to the battery terminal contact region. In the most preferred form and as shown in FIG. 2, such rotation is prevented by the restraining leg being engaged against a surface or at least in part restrained by a surface of the receiving compartment.

Figure 1:
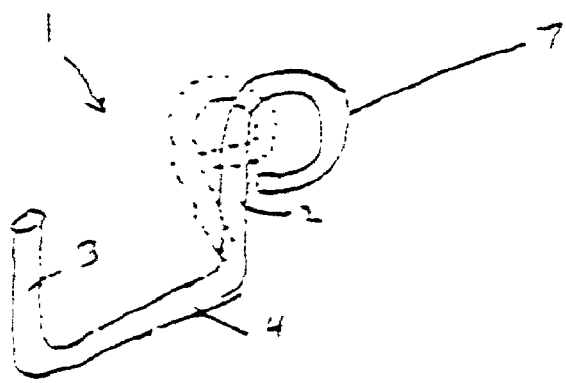
FIG. 1 is a perspective view of a form of battery contact of the present invention.
Figure 2:
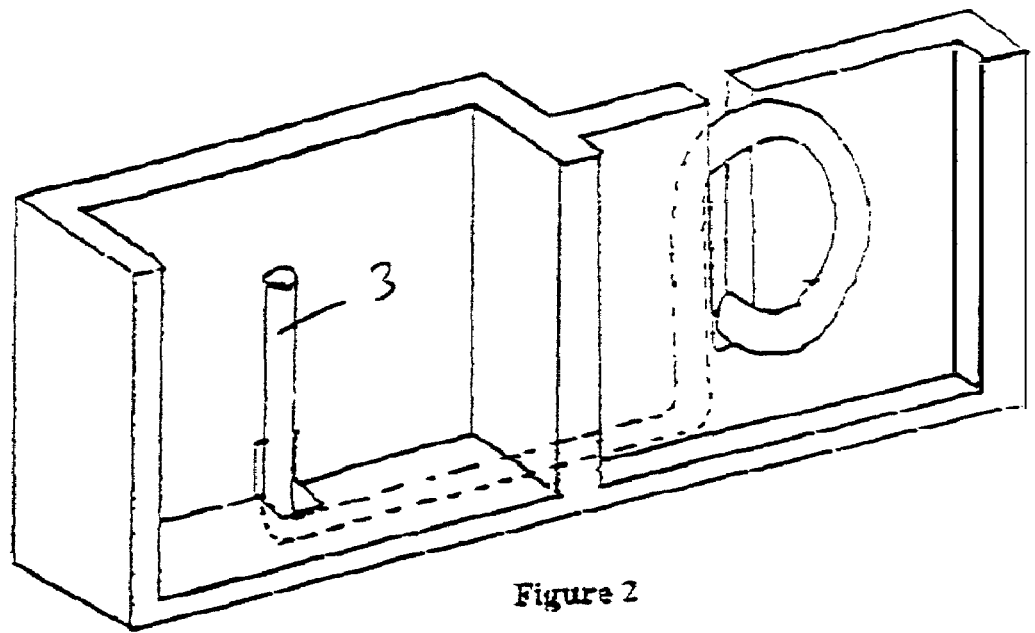
FIG. 2 is a perspective view of the battery contact of FIG. 1 positioned in situ with respect to a battery holder wherein the holder may in its entirety be in the form as shown in FIG. 2, or wherein the form as shown in FIG. 2 is a cut away view of the end of a battery holder.
Figure 3:
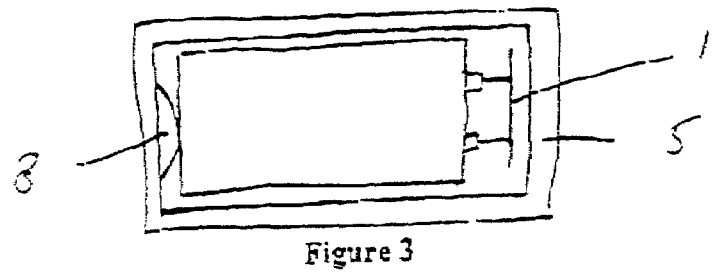
FIG. 3 is a plan view of a battery holder showing another form of the battery contact in position.
Figure 4:
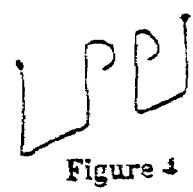
FIG. 4 is a perspective view of the battery contacts only as which may for example be used in the situation shown in FIG. 3, FIGS. 5-7 illustrate alternative battery contact configurations within the scope of the present invention.
Figure 8:
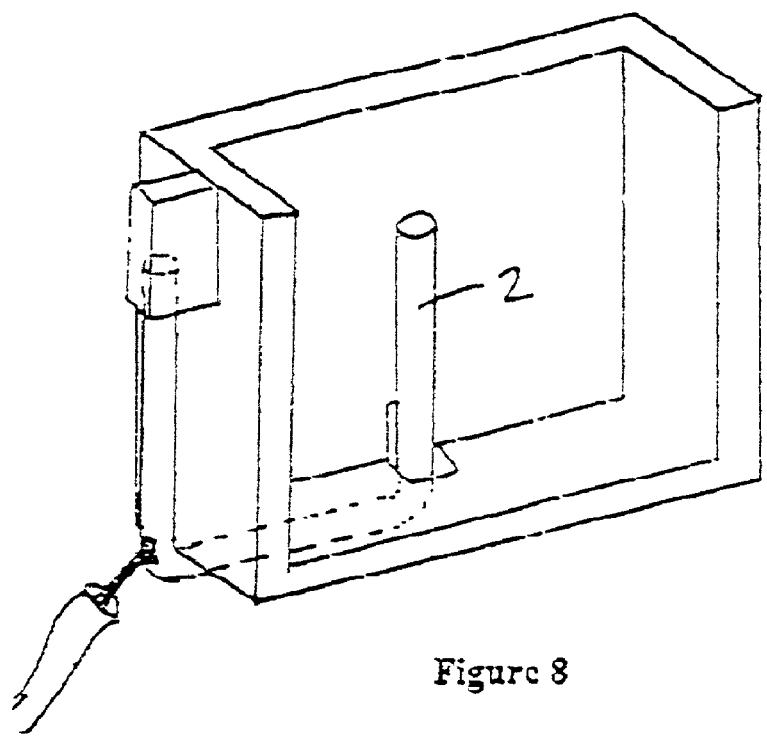
FIGS. 8-9 illustrate alternative battery holder configurations with different battery contacts provided thereto.
Figure 9:
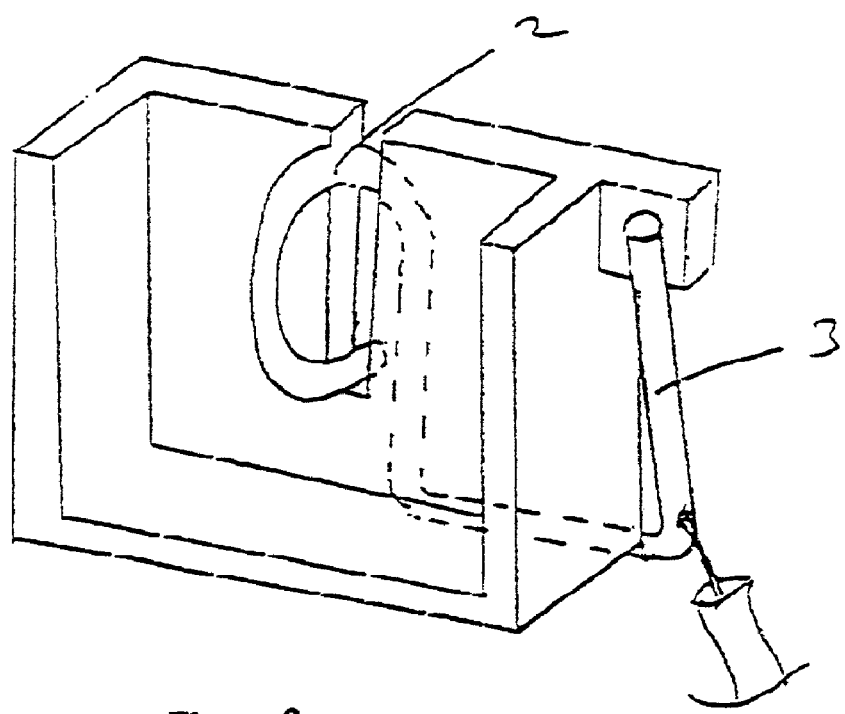
Figure 11:
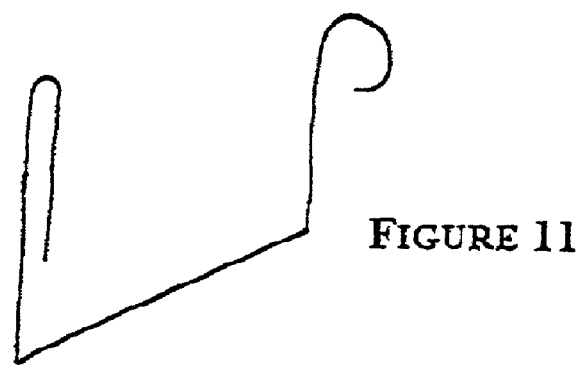
FIG. 11 is a perspective view of a battery contact wherein both the battery terminal contact region and the restraining legs have been provided in the form to be non-linear.
Figure 12:
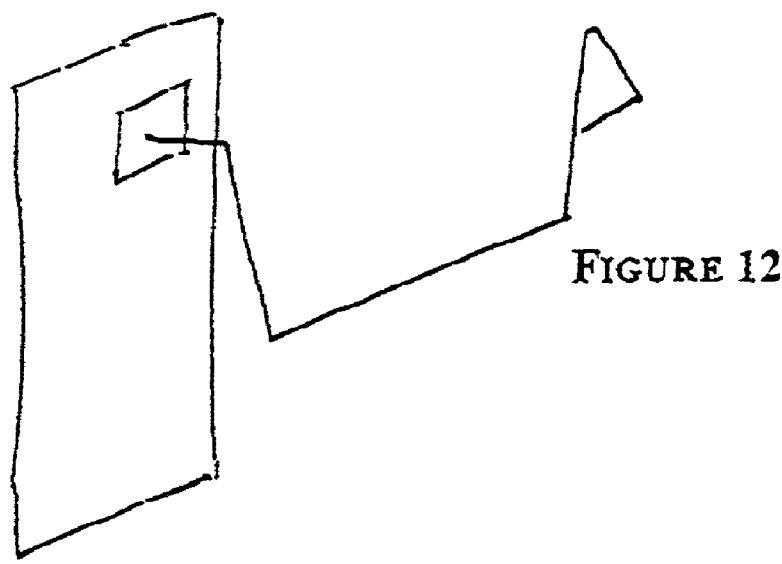
FIG. 12 is a perspective view of another embodiment of the battery contact of the present invention wherein the restraining leg has been formed to be provided to contact a circuit terminal point or region of for example a printed circuit board (PCB)
Figure 13:
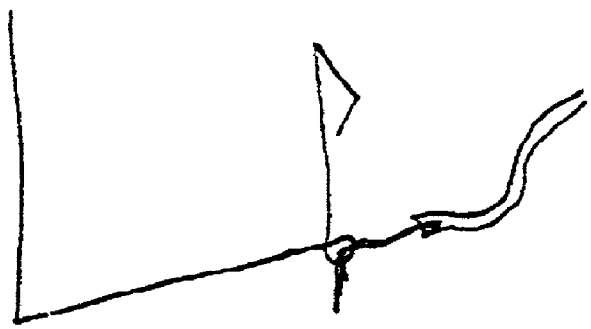
FIG. 13 is a perspective view of a battery contact of the present invention wherein a loop has been defined in the wire through which a circuit wire can be inserted and thereafter soldered to the battery contact.

In the configuration as shown in FIG. 2, the restraining leg 3 provides itself as a terminal contact member for a battery positioned adjacent that of the battery to be provided in contact with the battery terminal contact region. Such situations may arise where a plurality of batteries are provided in series in an adjacent arrangement. The conductivity of the shaped wire can hence provide for a positive to negative polarity connection between adjacent batteries for a series connection of several batteries. With reference to FIG. 9, a single battery contact arrangement is shown wherein the battery terminal contact region 2 is provided to be engaged with a terminal of a battery and wherein the restraining leg 3 is provided in a manner to provide the necessary restraint of rotational movement of the torsional region to thereby provide the torsional biasing to the battery terminal contact region. FIG. 8 shows a battery terminal contact region without having been modified from a straight form. Wiring may be appropriately welded or soldered or otherwise affixed to the battery contact as for example shown in FIGS. 8 and 9. In FIG. 13, the wire of the battery contact of the present invention may include a loop through which a circuit wire can be inserted thereafter being welded or soldered thereto. With reference to FIG. 4, a battery contact which may for example be employed in the arrangement as shown in FIG. 3 wherein the terminals of the battery are present from the same or proximate region of the battery and wherein two battery contacts are provided side by side.

Figure 6:
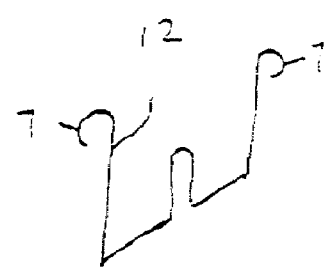
Figure 5:
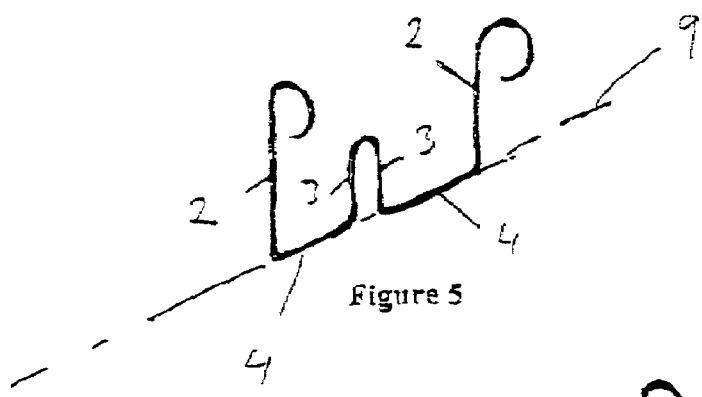
Figure 7:
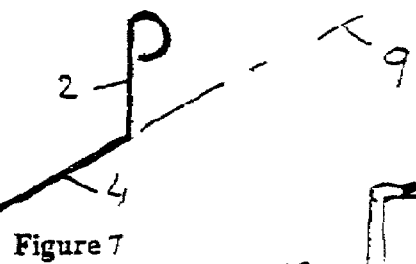
With reference to FIG. 7, the battery terminal contact region and the restraining leg may also not extend in the same direction from the torsional region of the wire. With reference to for example FIG. 9, some preloading in torsional tension may also be provided and may require a slight deflection in direction.
Figure 10:
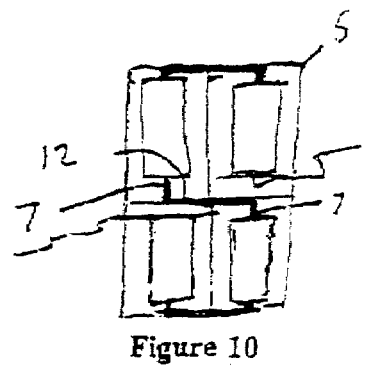
FIG. 10 illustrates a plan view of a battery holder holding a plurality of batteries and wherein various configurations of battery contacts as herein described may be arranged to provide a series connection to for example four batteries.
Figure 7A:
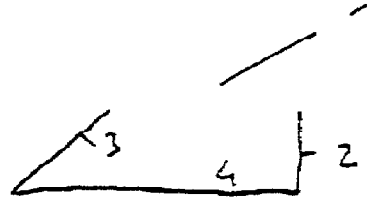
FIG. 7A is a front view of the battery contact of the present invention wherein it is shown that the restraining leg is at an acute angle relative to the torsional region of the wire.

FIG. 5 illustrates two battery contacts provided from a single length of wire wherein the restraining legs 3 are formed and provide the continuation of the wire. FIG. 6 illustrates an alternative and wherein for example it may be incorporated intermediate of batteries provided in a relationship as for example shown in FIG. 10.

Torsional battery contacts can be fitted in any type of battery holder, including ones to hold at least one A-A cell, AAA cell, C size, D size, N size, 9V cell, button cell batteries. Since it can be fitted in all sorts of battery holder, it can be used in any battery-perated products, for example, toys, electronic products, consumer products etc. Therefore it has a high commercial value. This invention reduces substantially the expenditure of relevant businesses using battery contacts, and hence has a good market development potential.

The invention claimed is:

1. A holder for a battery which provides opposite polarity terminals exposed therefrom, said holder comprising
    a battery receiving member dimensioned to receive at least in part a battery, said battery receiving member including at least one wall portion towards which a battery when in use is urged and wherein said one wall portion presents therefrom a battery contact, said battery contact comprising
    an elongate wire formed to define
    a) a single torsional region having first and second ends, and extending substantially straight along an axis between said first and second ends,
    b) a battery terminal contact region extending from the torsional region only at said first end of said torsional region and having a distal free end disposed away from said first end of said torsional region, said distal free end including a battery terminal contact point, to contact directly or indirectly when in use, a said terminal of said battery, and c) a restraining leg of said wire extending from said second end of said torsional region, said battery terminal contact region extending from said torsional region in a manner to be torsionally rotatable relative to said restraining leg about the axis between said first and second ends of said torsional region, and wherein the displacement of said battery terminal contact region is biased back to an original angular condition as a result of torsional rigidity provided by said torsional region, wherein said battery contact is supported by said battery receiving member in a manner to hold said restraining leg in a condition such that when a force is applied to said battery terminal contact region by said battery, the torsional force of said torsional region biases said battery terminal contact point towards said battery terminal, wherein said one wall portion includes at least one opening and the battery terminal contact point extends inward from said one wall portion through the at least one opening, and a remaining portion of said battery terminal contact region is located outside said one wall portion, and said restraining leg is rotationally restrained in at least the same rotational direction as the force applied to said torsional region by said battery terminal contact region, by said leg being located at least in part against an inner region of said one wall portion of said battery receiving member, said restraining leg in use is rigidly held by said one wall portion and said battery terminal contact region is resiliently rotatable about said axis of said torsional region;

said battery terminal contact region includes a straight section extending from said torsional region and a curved section intermediate of said straight section and said distal end of said wire at said battery terminal contact region;

wherein said curved section of said battery terminal contact region defines a plane which is substantially perpendicular to said one wall portion;

and wherein said curved section is urged in a direction along said plane and outwardly through said opening, in response to said force applied by said battery.

2. A holder as claimed in claim 1 wherein said restraining leg and said battery contact region of said wire extend from said torsional region to each include a respective distal end of said shaped wire.

3. A holder as claimed in claim 2 wherein said restraining leg is in use rigidly held by said one wall portion and said battery terminal contact region is resiliently rotatable about said axis of said torsional region.

4. A holder as claimed in claim 3 wherein said restraining leg extends from said torsional region, at least in part in a straight form.

5. A holder as claimed in claim 4 wherein said restraining leg is straight.

6. A holder as claimed in claim 4 wherein said restraining leg is non linear.

7. A holder as claimed in claim 6 wherein said restraining leg includes a bend.

8. A holder as claimed in claim 7 wherein said restraining leg includes a battery terminal contact point.

9. A holder as claimed in claim 8 wherein said restraining leg includes a PCB terminal contact point.

10. A holder as claimed in claim 9 wherein said battery terminal contact region is non-linear.

11. A holder as claimed in claim 10 wherein said battery terminal contact region includes at least one bend.

12. A holder as claimed in claim 1 wherein said restraining leg is a torsional region rotation restraining arm which restrains the rotation of said torsional region at said second end of said torsional region as a result of force application to said torsional region by said battery terminal contact region.

13. A holder as claimed in claim 12 wherein the transition of the wire between said torsional region and the restraining leg and battery terminal contact region is defined by a bend in the wire.

14. A holder as claimed in claim 13 wherein said wall portion defines a separation between a region of said holder where a said battery is to be located and the exterior of such a region, said wall portion having at least one opening through which at least portions of said battery contact extend to be presented for contact with a terminal of said battery.

15. A holder as claimed in claim 14 wherein said torsional region and said restraining leg are translationally fixed relative to said holder, and said battery terminal contact region is rotationally displaceable relative to said holder.

16. A holder as claimed in claim 15 wherein said battery terminal contact region and said restraining leg of said wire extend transverse from the torsional region.

17. A holder for a battery which provides opposite polarity terminals exposed therefrom, said holder comprising a battery receiving member dimensioned to receive at least in part a battery, said battery receiving member including at least one wall portion towards which a battery when in use is urged and wherein said one wall portion presents therefrom a battery contact, said battery contact comprising an elongate wire formed to define a) a torsional region having first and second ends, and extending substantially straight along an axis between said first and second ends, b) a battery terminal contact region extending from the torsional region only at said first end of said torsional region and having a distal free end disposed away from said first end of said torsional region, said distal free end including a battery terminal contact point, to contact directly or indirectly when in use, a said terminal of said battery, and c) a restraining leg of said wire extending from said second end of said torsional region, said battery terminal contact region extending from said torsional region in a manner to be torsionally rotatable relative to said restraining leg about the axis between said first and second ends of said torsional region, and wherein the displacement of said battery terminal contact region is biased back to an original angular condition as a result of torsional rigidity provided by said torsional region, wherein said battery contact is supported by said battery receiving member in a manner to hold said restraining leg in a condition such that when a force is applied to said battery terminal contact region by said battery, the torsional force of said torsional region biases said battery terminal contact point towards said battery terminal, wherein said one wall portion includes at least one opening and the battery terminal contact point extends inward from said one wall portion through the at least one opening, and a remaining portion of said battery terminal contact region is located outside said one wall portion, and said restraining leg is rotationally restrained in at least the same rotational direction as the force applied to said torsional region by said battery terminal contact region, by said leg being located at least in part against an inner region of said one wall portion of said battery receiving member;

said restraining leg in use is rigidly held by said one wall portion and said battery terminal contact region is resiliently rotatable about said axis of said torsional region;

said battery terminal contact region includes a straight section extending from said torsional region and a curved section intermediate of said straight section and said distal end of said wire at said battery terminal contact region;

wherein said curved section of said battery terminal contact region defines a plane which is substantially perpendicular to said one wall portion;

and wherein said curved section is urged in a direction along said plane and outwardly through said opening, in response to said force applied by said battery.

18. A holder as claimed in claim 17 wherein said restraining leg and said battery contact region of said wire extend from said torsional region to each include a respective distal end of said shaped wire.

19. A holder as claimed in claim 18 wherein said restraining leg is in use rigidly held by said one wall portion and said battery terminal contact region is resiliently rotatable about said axis of said torsional region.

20. A holder as claimed in claim 19 wherein said restraining leg extends from said torsional region, at least in part in a straight form.

21. A holder as claimed in claim 20 wherein said restraining leg is straight.

22. A holder as claimed in claim 20 wherein said restraining leg is non-linear.

23. A holder as claimed in claim 22 wherein said restraining leg includes a bend.

24. A holder as claimed in claim 23 wherein said restraining leg includes a battery terminal contact point.

25. A holder as claimed in claim 24 wherein said restraining leg includes a PCB terminal contact point.

26. A holder as claimed in claim 25 wherein said battery terminal contact region is non-linear.

27. A holder as claimed in claim 26 wherein said battery terminal contact region includes at least one bend.

28. A holder as claimed in claim 17 wherein said restraining leg is a torsional region rotation restraining arm which restrains the rotation of said torsional region at said second end of said torsional region as a result of force application to said torsional region by said battery terminal contact region.

29. A holder as claimed in claim 28 wherein the transition of the wire between said torsional region and the restraining leg and battery terminal contact region is defined by a bend in the wire.

30. A holder as claimed in claim 29 wherein said wall portion defines a separation between a region of said holder where a said battery is to be located and the exterior of such a region, said wall portion having at least one opening through which at least portions of said battery contact extend to be presented for contact with a terminal of said battery.

31. A holder as claimed in claim 30 wherein said torsional region and said restraining leg are translationally fixed relative to said holder, and said battery terminal contact region is rotationally displaceable relative to said holder.

32. A holder as claimed in claim 31 wherein said battery terminal contact region and said restraining leg of said wire extend transverse from the torsional region.

33. A holder as claimed in claim 1 wherein:

said battery receiving member further comprises a second wall portion, extending from said one wall portion which presents said battery contact;

at said second end of the torsional region, the torsional region is disposed adjacent said second wall portion and spaced away from said one wall portion;

whereby said restraining leg extends from said second end of the torsional region, toward said one wall portion, through an opening in said second wall portion.

34. A holder as claimed in claim 17, wherein:

said battery receiving member further comprises a second wall portion, extending from said one wall portion which presents said battery contact;

at said second end of the torsional region, the torsional region is disposed adjacent said second wall portion and spaced away from said one wall portion;

whereby said restraining leg extends from said second end of the torsional region, toward said one wall portion, through an opening in said second wall portion.

* * * * *